Jan. 18, 1938. J. J. HRUSKA 2,105,859
SAFETY VEHICLE TIRE
Filed Sept. 30, 1936
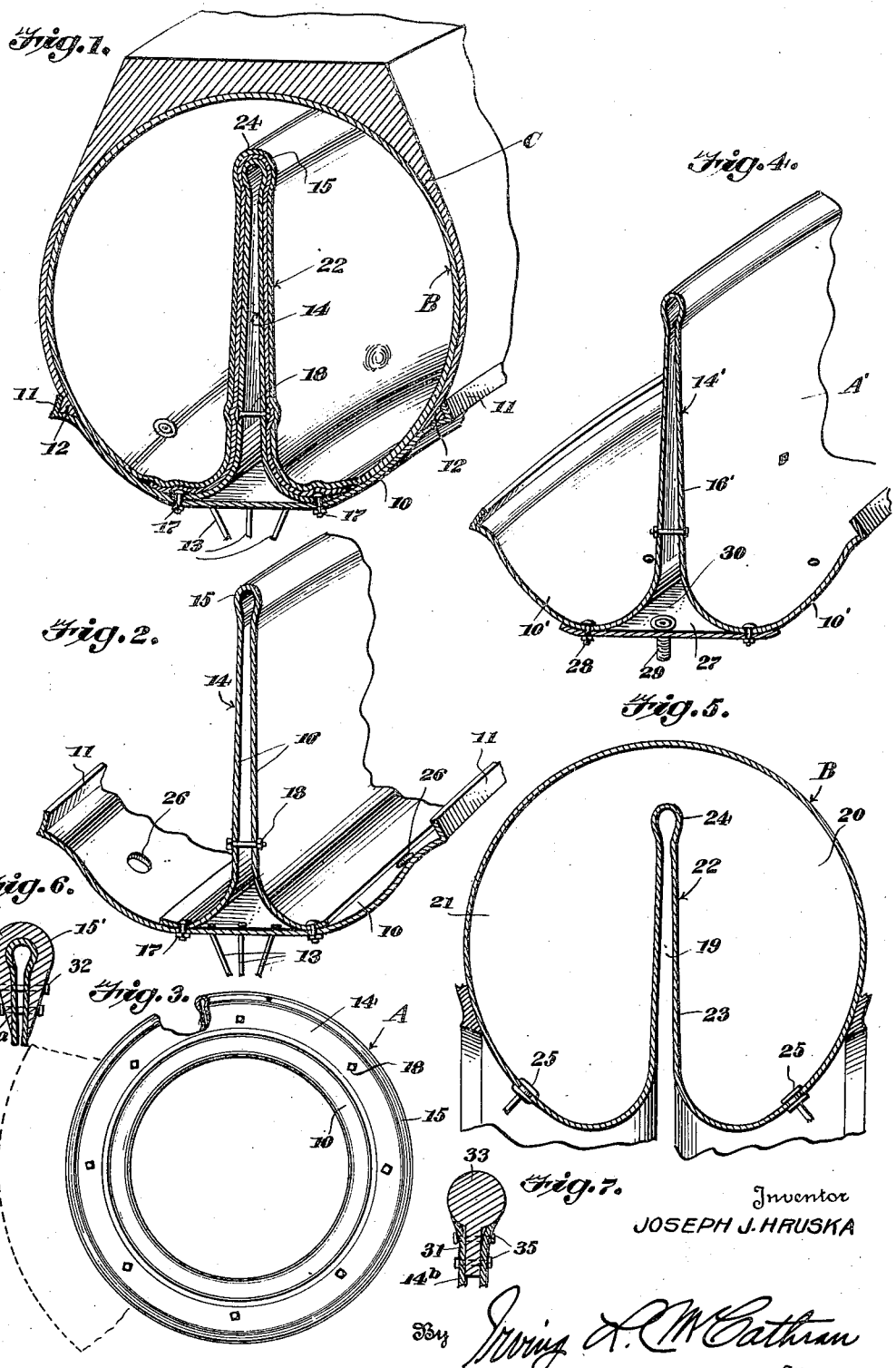
Inventor
JOSEPH J. HRUSKA Patented Jan. 18, 1938

2,105,859

UNITED STATES PATENT OFFICE 2,105,859

SAFETY VEHICLE TIRE

Joseph J. Hruska, Milwaukee, Wis.

Application September 30, 1936, Serial No. 103,430

3 Claims. (Cl. 152—10)

This invention relates to a safety vehicle tire and has for one of its objects the production of a simple and efficient means for preventing the collapse of a tire should the same become punctured, cut, crushed, or should a blow-out occur, thereby preventing the dropping of the vehicle to one side for any great amount of distance when the tire suddenly becomes deflated.

A further object of this invention is the production of a simple and efficient means placed internally of a vehicle tire for supporting the tire tread independent of air pressure should the tire become deflated as a result of a blow-out, puncture, or the like.

Other objects and advantages of the present invention will appear throughout the following specification and claims.

In the drawing:—

Figure 1 is a transverse sectional perspective view of the improved tire and safety rim;

Figure 2 is a transverse sectional perspective view of a fragment of the safety rim;

Figure 3 is a side elevation of the safety rim, a portion being shown in section;

Figure 4 is a sectional perspective view of a modified type of safety rim;

Figure 5 is a transverse sectional view of the improved inner tube, portions of the outer casing of the tire being shown;

Figure 6 is a transverse sectional view showing a modified form of the bead carried by the annular member; and Figure 7 is a transverse sectional view showing a still further modified form of the bead carried by the annular member.

By referring to the drawing, it will be seen that A designates the improved safety rim which supports an improved inner tube B and an outer tire casing C.

The improved safety rim A comprises a rim portion 10 having a tire casing engaging flanges 11 along its sides for engaging the heel portions 12 of the tire casing C—note Figure 1. This rim portion 10 may be attached in any suitable or desired manner, depending upon the type of wheel upon which the device is used, but if a wire wheel is employed, the spokes 13 may be attached to the rim portion 10 in the conventional manner, as shown in Figures 1 and 2. The rim portion 10 is provided with a centrally located annular member 14 secured and located centrally around the circumference of the rim portion 10, and this member 14 is preferably pressed from sheet metal or similar material having an enlarged bead 15 along its outer periphery which is supported by a pair of spaced walls 16, the inner edges of which are flared outwardly away from each other preferably on the arc of a circle and secured to the inner face of the rim portion 10 by rivets 17. The spaced walls 16 may be held against expansion by securing bolts 18 which pass through the walls 16 near their inner ends, as shown.

The improved inner tube B which is shaped to conform to the contour of the rim A is adapted to be fitted over the member 14 and is provided with an inwardly extending annular channel 19 within which is adapted to fit the member 14, in this way dividing the inner tube B into compartments 20 and 21 upon either side of the partition 22 formed by the parallel walls 23 which produce the channel 19. A bead portion 24 is formed along the inner end of the partition 22 to fit snugly around the outer bead portion 15 of the member 14. Valves 25 are provided for each compartment 20 and 21 to facilitate the inflation of the inner tube B, although in some instances only a single valve may be necessary. Two valves are preferable in order that air may be forced into both compartments without difficulty. The rim 10 is provided with apertures 26 for the purpose of receiving the valves 25.

In Figure 4 there is shown a slightly modified form of the device wherein a rim A' is illustrated comprising a structure wherein the member 14' is formed integral with the rim portion 10', the rim portion 10' forming a continuation of the walls 16' of the member 14'. The rim portion 10' is braced upon either side by means of a connecting annular plate 27 secured to the rim portions 10' by means of rivets 28. A valve 29 may be carried by the plate 27 for the purpose of permitting the forcing of cool water into the compartment 30 formed by the walls 16' and the plate 27.

By carefully considering the drawing and also the above description, it will be noted that the member 14 extends well within the casing C of the tire and to a point in relatively close proximity to the tread of the tire. Consequently, should the tire become deflated by any cause, only a slight drop would occur equivalent to the distance between the inner face of the tread of the tire and the outer edge of the bead 15. In this way, should the tire become suddenly deflated owing to any cause, the car upon which the tire is mounted will not suddenly drop for any great distance which would be likely to cause the car to run into traffic or into the ditch, but on the other hand, the outer edge of the bead 15 will provide an emergency support to prevent the tire from completely collapsing until proper repair has been made. The bead 15 is preferably of sufficient size and is rounded on its outer face to prevent cutting of the casing C or the tube B while the device is functioning as an emergency support.

If it should be so desired, the bead 15' may be covered with a solid rubber tread portion 31 fitting snugly around the bead 15' and secured in place by suitable rivets or fastening means 32 through the member 14a.

In the structure shown in Figure 7, a solid rubber tread portion 33 may be employed having its shank 34 fitted or wedged between the walls of the member 14b. Rivets 35 may be used for holding the shank in position.

It is a well-known fact that blow-outs are usually caused by heating up of a tire and to avoid this difficulty water may be inserted through the valve 29 into the compartment 30, should it be desired, for the purpose of cooling the interior of the tire and reducing the temperature thereof.

It should be understood that certain detail changes in the mechanical construction may be employed without departing from the spirit of the invention, so long as such changes fall within the scope of the appended claims.

Having described the invention, what is claimed as new is:

1. A safety rim of the class described formed from sheet metal and the like, comprising an annular member, said annular member comprising a pair of substantially parallel walls having an integral connecting bead portion along the outer peripheries thereof and forming a continuation of the walls, the inner edges of the walls being flared outwardly, means spanning the inner peripheries of the walls and connected thereto for firmly bracing the walls at their inner ends and holding the same in firm spaced relation, and means extending transversely of the walls intermediate the inner and outer peripheries for holding said walls against lateral expansion.

2. A safety rim of the class described formed from sheet metal and the like, comprising an annular member, said annular member comprising a pair of substantially parallel walls having an integral connecting bead portion along the outer peripheries thereof and forming a continuation of the walls, the inner edges of the walls being flared outwardly, means spanning the inner peripheries of the walls and connected thereto for firmly bracing the walls at their inner ends and holding the same in firm spaced relation, means extending transversely of the walls intermediate the inner and outer peripheries for holding said walls against lateral expansion, the inner peripheries of the walls being flared outwardly and upwardly to provide a tire-engaging portion, and terminating in tire-engaging flanges.

3. As a new article of manufacture, a safety rim stamped from sheet metal and the like and comprising an annular outwardly extending member, said member comprising a pair of substantially spaced walls integrally connected at their outer peripheries by an integral bead portion, the inner peripheries being flared outwardly and away from each other, a connecting plate secured to the outwardly flared portions for anchoring the inner peripheries of the annular member and holding the walls against lateral spreading, a cushioning member fitting over the bead portion and straddling the walls, and transverse securing means passing through the walls and said cushioning member.

JOSEPH J. HRUSKA.